(12) United States Patent
Phillips (10) Patent No.: US 10,552,418 B2
(45) Date of Patent: Feb. 4, 2020

(54) OPTIMIZATION OF FIRST SET OF ORDERED ITEMS AND DELAYED NON-DUPLICATED WORK QUEUE

(71) Applicant: Ancestry.com Operations Inc., Lehi, UT (US)

(72) Inventor: Jeff Phillips, Lehi, UT (US)

(73) Assignee: ANCESTRY.COM OPERATIONS INC., Lehi, UT (US)

( * ) Notice: Subject to any disclaimer, the term of this patent is extended or adjusted under 35 U.S.C. 154(b) by 431 days.

(21) Appl. No.: 15/393,637

(22) Filed: Dec. 29, 2016

(65) Prior Publication Data

US 2018/0189287 A1    Jul. 5, 2018

(51) Int. Cl.
*G06F 16/2455*    (2019.01)
*G06F 16/23*    (2019.01)

(52) U.S. Cl.
CPC .... *G06F 16/24552* (2019.01); *G06F 16/2358* (2019.01)

(58) Field of Classification Search
CPC .................. G06F 16/2358; G06F 16/24552
USPC ................................................ 707/714, 718
See application file for complete search history.

(56) References Cited

U.S. PATENT DOCUMENTS

| | | | | |
|---|---|---|---|---|
| 5,729,711 A | * | 3/1998 | Okamoto ............ | G06F 12/0802 711/130 |
| 6,330,657 B1 | * | 12/2001 | Col .......................... | G06F 9/28 711/123 |
| 7,668,846 B1 | * | 2/2010 | Ghemawat .......... | G06F 11/1471 707/648 |
| 10,073,657 B2 | * | 9/2018 | Tanaka ................. | G06F 3/0653 |
| 2013/0132861 A1 | * | 5/2013 | Kienzle ................. | G06Q 10/10 715/753 |
| 2014/0258638 A1 | * | 9/2014 | Traut ................... | G06F 12/0866 711/135 |
| 2017/0011110 A1 | * | 1/2017 | Yamada .............. | G06F 11/1446 |
| 2018/0046664 A1 | * | 2/2018 | Nishikawa .............. | G06F 12/00 |

* cited by examiner

*Primary Examiner* — Phong H Nguyen
(74) *Attorney, Agent, or Firm* — Kilpatrick Townsend & Stockton LLP (57) ABSTRACT

Systems and methods for retrieving a set of ordered items from a distributed database. A plurality of ordered items may be stored at a cache. The plurality of ordered items may have a length of N+B at a first instant in time. A first instruction to delete a first item of the plurality of ordered items may be received. A second instruction to add a second item to the plurality of ordered items may be received. The first instruction and the second instruction may be stored in a change log. A request for the first N items of the plurality of ordered items may be received. The first instruction may be executed by deleting the first item from the plurality of ordered items. The second instruction may be executed by adding the second item to the plurality of ordered items. The first N items of the plurality of ordered items may be sent in response to the request.

17 Claims, 10 Drawing Sheets

OPTIMIZATION OF FIRST SET OF ORDERED ITEMS AND DELAYED NON-DUPLICATED WORK QUEUE

BACKGROUND OF THE INVENTION

In very large distributed databased (e.g., NoSQL databases) in which data is partitioned across multiple servers, retrieving the first N items with a given sort order can be very slow because the data is typically stored in the database unsorted. Therefore, the database must retrieve the items and then sort the items before returning them to the requestor. For large data sets, this is impractical or prohibitively slow. Improvements in the area are needed.

BRIEF SUMMARY OF THE INVENTION

A method for retrieving N items from a distributed database is provided. The method may include storing, at a cache, a plurality of ordered items. The plurality of ordered items may have a length of N+B at a first instant in time. N and B may be positive integers. The method may include receiving, at the cache, a first instruction to delete a first item of the plurality of ordered items. The method may include receiving, at the cache, a second instruction to add a second item to the plurality of ordered items. The method may include storing the first instruction and the second instruction. The method may include receiving, at the cache, a request for the first N items of the plurality of ordered items. The method may include executing the first instruction by deleting the first item from the plurality of ordered items. The method may include executing the second instruction by adding the second item to the plurality of ordered items. The method may include sending the first N items of the plurality of ordered items in response to the request.

In some embodiments, the first instruction and the second instruction may be stored in a change log. In some embodiments, deleting a certain item from the plurality of ordered items may cause the length of the plurality of ordered items to decrease by one. In some embodiments, adding the certain item to the plurality of ordered items may cause the length of the plurality of ordered items to increase by one. In some embodiments, the method includes receiving, at the cache, a third instruction to update a third item of the plurality of ordered items. In some embodiments, the method includes storing the third instruction. In some embodiments, the method includes executing the third instruction by updating the third item of the plurality of ordered items. In some embodiments, executing the first instruction and executing the second instruction occur after receiving the request. In some embodiments, sending the first N items may occur after executing the first instruction and executing the second instruction. In some embodiments, the plurality of ordered items has a length of less than N at a second instant in time. In some embodiments, the method includes invaliding the cache. In some embodiments, the method includes rebuilding the cache such that the plurality of ordered items has a length of N+B.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION OF THE INVENTION

Optimization of First Set of Ordered Items

Embodiments of the present disclosure allow efficient retrieval of N items from a distributed database in which data is stored across various servers. In some embodiments, the N items are a set of items that are frequently retrieved from the distributed database, such as a set of descendants in a genealogical database for a commonly researched family line. Furthermore, the N items may have a particular order and the requestor of the items may request that they are returned in that order. An example of a set of ordered items may be a set of lineal descendants in a genealogical database which are generally ordered from most recent to least recent in terms of date of birth. In such scenarios in which the same set of ordered items are frequently requested, for example, on the order of thousands of times per second, it is advantageous to maintain a separate cache containing the items that can easily send the items to the requestor in the proper order.

One difficulty with maintaining a separate cache is dealing with changes that occur to the N items during routine operation of the distributed database. For example, in a genealogical database, records of individuals may be updated, added, and/or deleted by users of the genealogical database. When a certain item is updated, added, and/or deleted at a certain server within a distributed database, the copy of that certain item that is stored in the cache may need to similarly reflect that change. There are two primary methods to accomplish this. The first method includes maintaining a change log containing each instruction for modifying items within the cache, and executing the instructions contained in the change log when a request for the N items is made. The second method includes immediately updating the cache according to the instruction. These will be discussed in further detail below.

Another difficulty with maintaining a separate cache is dealing with fluctuations in the length of the ordered items. For example, when a user requests the N items from the cache after several deletions of the N items have occurred, the cache may return an error because there are fewer than N items available. To resolve this, embodiments of the present disclosure include a cache that stores the first N+B items of a set of ordered items and returns only the first N items when a request is made. This allows the cache to tolerate B deletions (assuming no additions) before it is invalidated.

Figure 1:
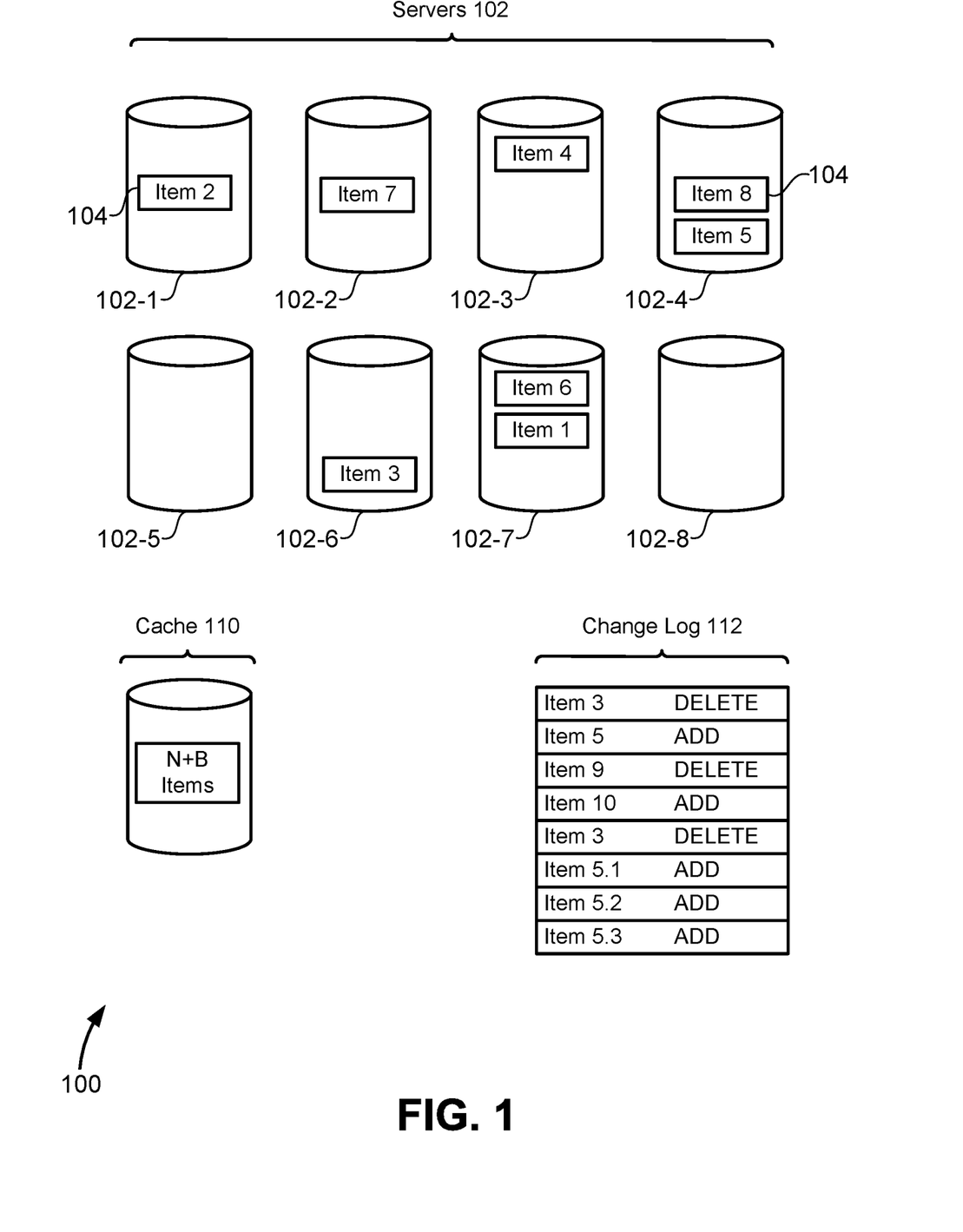
FIG. 1 illustrates a distributed database, according to an embodiment of the present disclosure.

FIG. 1 illustrates a distributed database 100, according to an embodiment of the present disclosure. The distributed database 100 includes a cache 110, a change log 112, and servers 102 for storing a set of ordered items 104. Cache 110 may be located within servers 102, separate from servers 102, or external to the distributed database 100. Similarly, change log 112 may be located within cache 110, within servers 102, or external to the distributed database 100. The distributed database 100 may frequently receive requests for the set of ordered items 104. The requestor of the set of ordered items 104 will generally use the items in such a way that their order is important. The common approach is to return the set of ordered items 104 to the requestor in an unordered manner and make the requestor sort and order the items after they are received. The approach of the present disclosure includes maintaining cache 110 containing the set of ordered items 104 in the proper order.

Cache 110 stores N+B of the set of ordered items 104 (N and B being positive integers). In some embodiments, the length of the set of ordered items 104 may be equal to N+B, may be equal to N, or may be more or less than these quantities. For example, when the length of the set of ordered items 104 is greater than N+B, cache 110 stores only the first N+B of the set of ordered items 104. Cache 110 may similarly store only the last N+B items or store N+B items in the middle of the set of ordered items 104. Although a requestor may generally request and retrieve the first N items from cache 110, the requestor may also request all N+B items, or some other quantity of items. Cache 110 may either contain copies of the set of ordered items 104 or may contain the locations of the set of ordered items 104 within servers 102 (e.g., pointers).

In some embodiments, the set of ordered items 104 are stored at various locations throughout servers 102. The set of ordered items 104 may be data files, including text files, and may be stored all in a single server 102 or dispersed evenly throughout servers 102. For example, FIG. 1 shows Item 2 stored in server 102-1, Item 7 stored in server 102-2, Item 4 stored in server 102-3, Items 5 and 8 stored in server 102-4, Item 3 stored in server 102-6, and Items 1 and 6 stored in server 102-7. Servers 102-5 and 102-8 contain no items from the set of ordered items 104.

During routine operation, the distributed database 100 may receive work messages and/or instructions for modifying the set of ordered items 104, such as updates, additions and deletions. In some embodiments, the received instructions are executed immediately both to the set of ordered items 104 in servers 102 and to the set of ordered items 104 in cache 110. In some embodiments, the instructions are stored in change log 112 and executed only after a request for the set of ordered items 104 is made. Change log 112 shown in FIG. 1 contains 8 different instructions that will be executed after a request is made. The first instruction includes deleting Item 3 from the set of ordered items 104. Executing this instruction includes locating the item in cache 110 and removing the item from cache 110 such that the length of the set of ordered items 104 contained in cache 110 is reduced by 1. The last instruction contained in change log 112 includes adding Item 5.3 to the set of ordered items 104. Executing this instruction includes locating where Item 5.3 could be inserted in the set of ordered items 104 to maintain the proper order, and then inserting Item 5.3 at that location.

Figure 2:
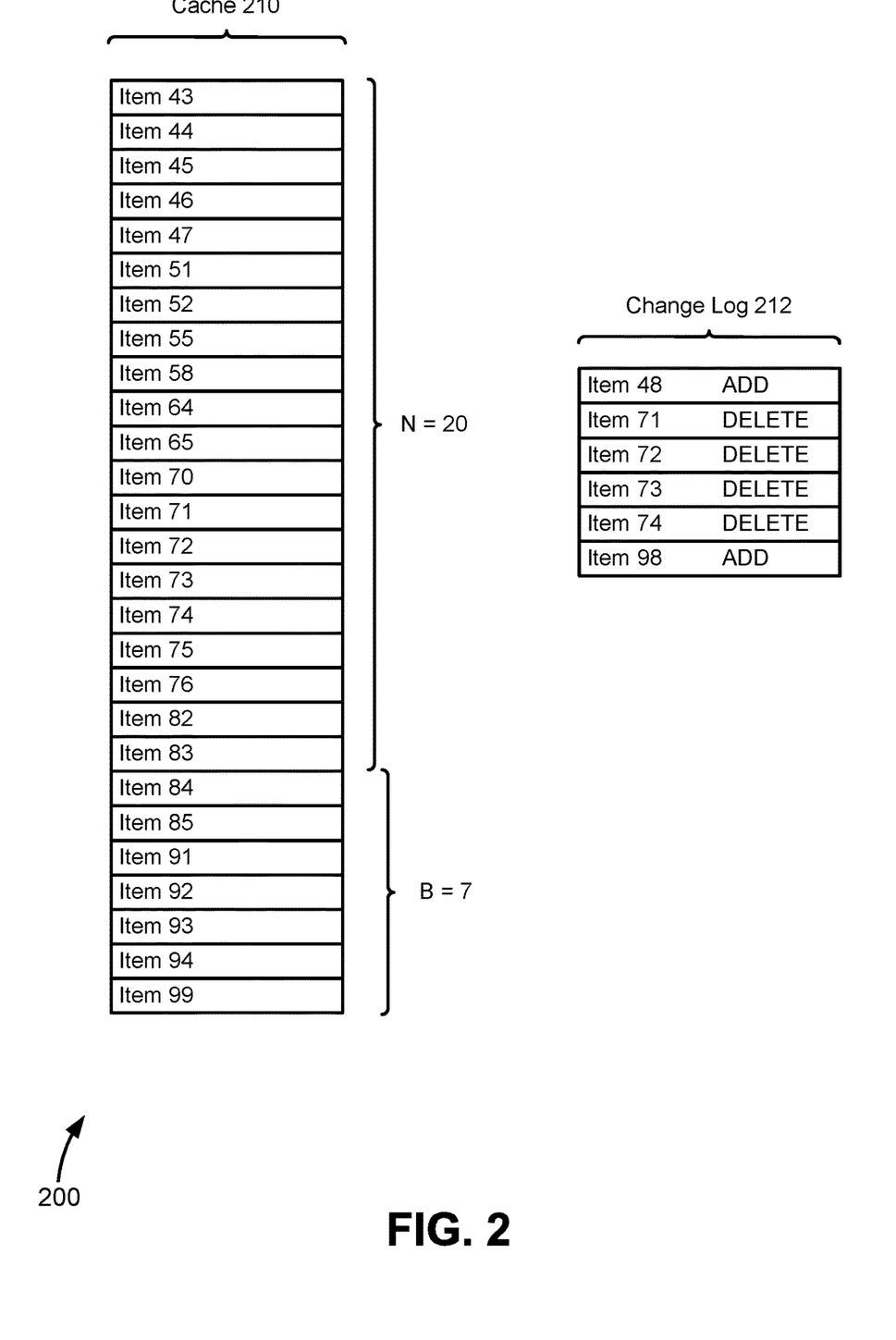
FIG. 2 illustrates a cache and a change log within a distributed database, according to an embodiment of the present disclosure.

FIG. 2 illustrates a cache 210 and a change log 212 within a distributed database 200, according to an embodiment of the present disclosure. Cache 210 has an N equal to 20 and a B equal to 7. Thus, in some embodiments a requestor of the set of ordered items may receive 20 items (Items 43 through Items 83), and cache 210 can tolerate a net total of 7 deletions before it is invalidated. For example, if a change log contains 20 deletions and 14 additions, cache 210 will not be invalidated because the net total of deletions is 6. As another example, if a change log contains 30 deletions and 20 additions, cache 210 will be invalidated because the net total of deletions is 10. Change log 212 contains 6 instructions which are executed after or upon a request being received by cache 210 or by the distributed database 200.

Figure 3:
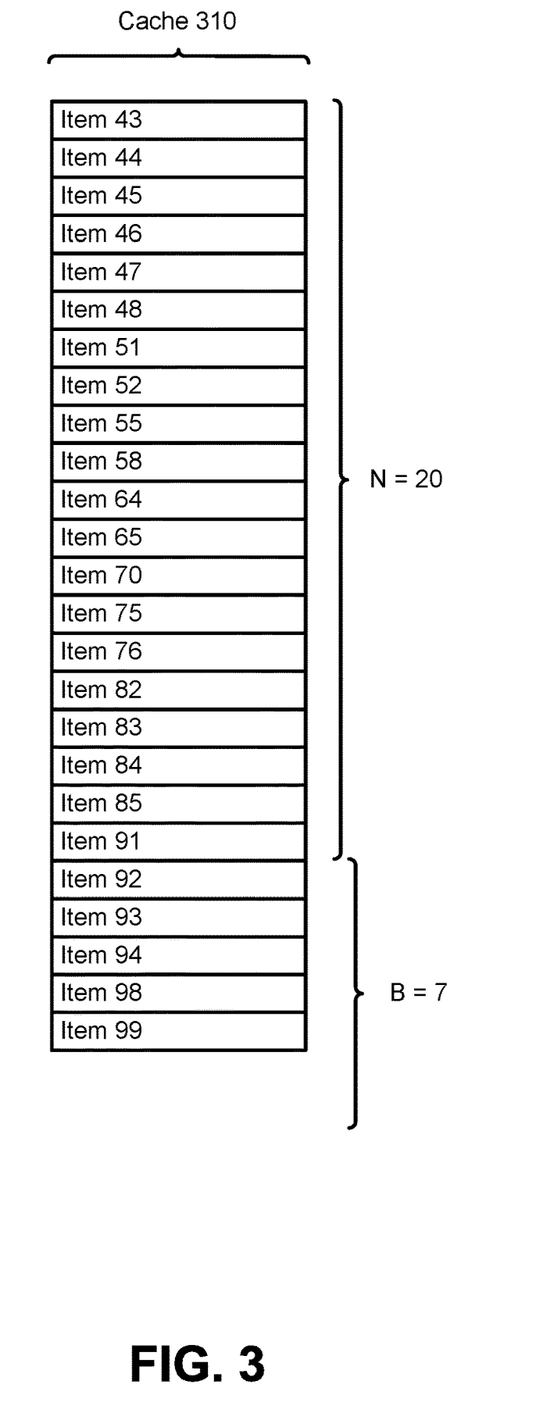
FIG. 3 illustrates a cache, according to an embodiment of the present disclosure.

FIG. 3 illustrates a cache 310, according to an embodiment of the present disclosure. Cache 310 is the result of executing the instructions contained in change log 212. Cache 310 contains a set of ordered items having a length of N−B−2, which is equal to 25. The length of the set of ordered items was reduced by 2 because change log 212 includes 4 deletions and 2 additions. Because of the modifications to cache 310, a request for the set of ordered items would return Items 43 through Items 91.

Figure 4:
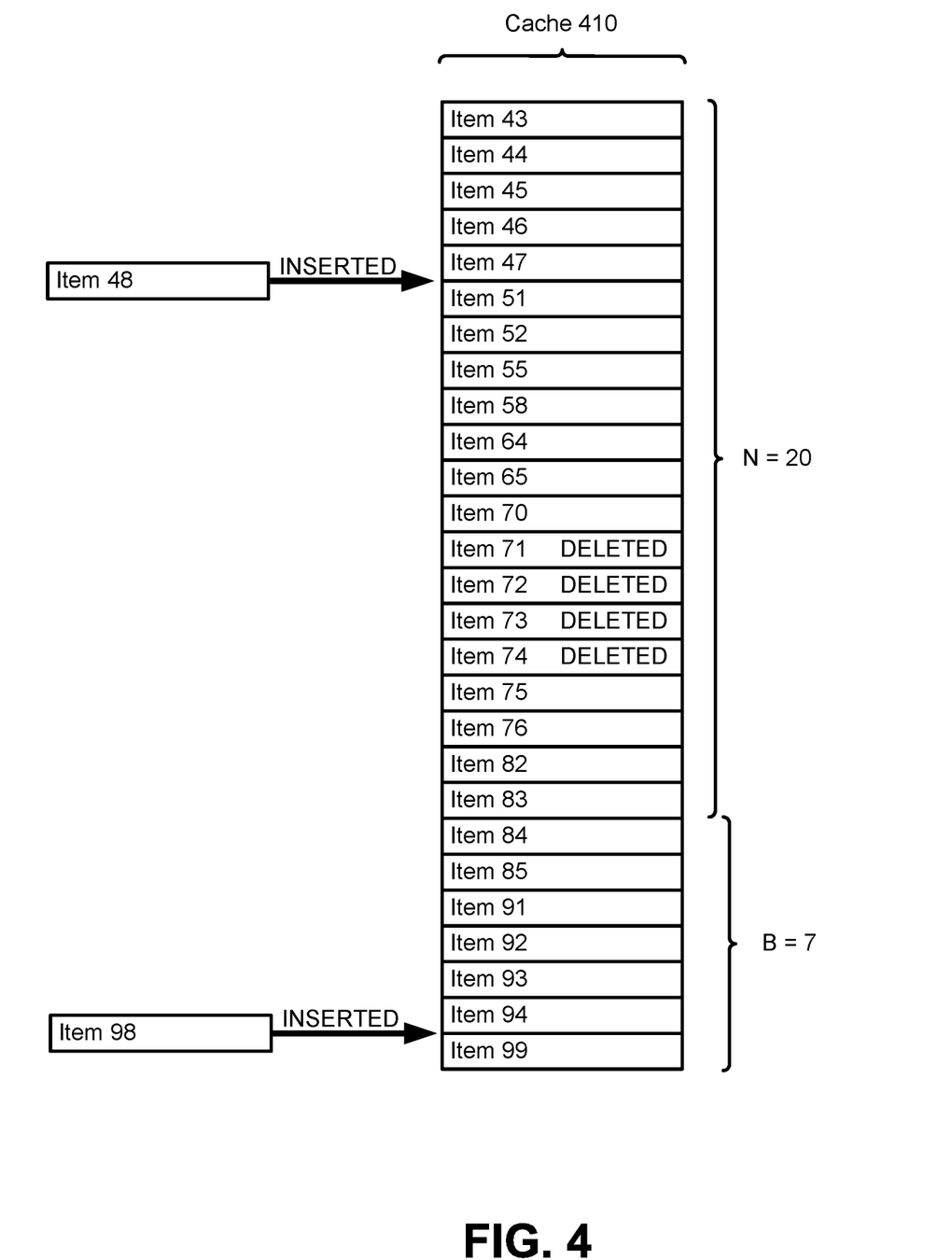
FIG. 4 illustrates a cache, according to an embodiment of the present disclosure.

FIG. 4 illustrates a cache 410, according to an embodiment of the present disclosure. FIG. 4 illustrates an embodiment in which instructions are executed immediately upon being received by cache 410 and/or a change log associated with cache 410. FIG. 4 also illustrates the embodiment described in reference to FIGS. 2 and 3 in which instructions are executed after a request is received by cache 210. First, Item 48 is inserted between Items 47 and 51. Second, Items 71 through Items 74 are deleted. Third, Item 98 is inserted between Items 94 and 99.

Figure 5:
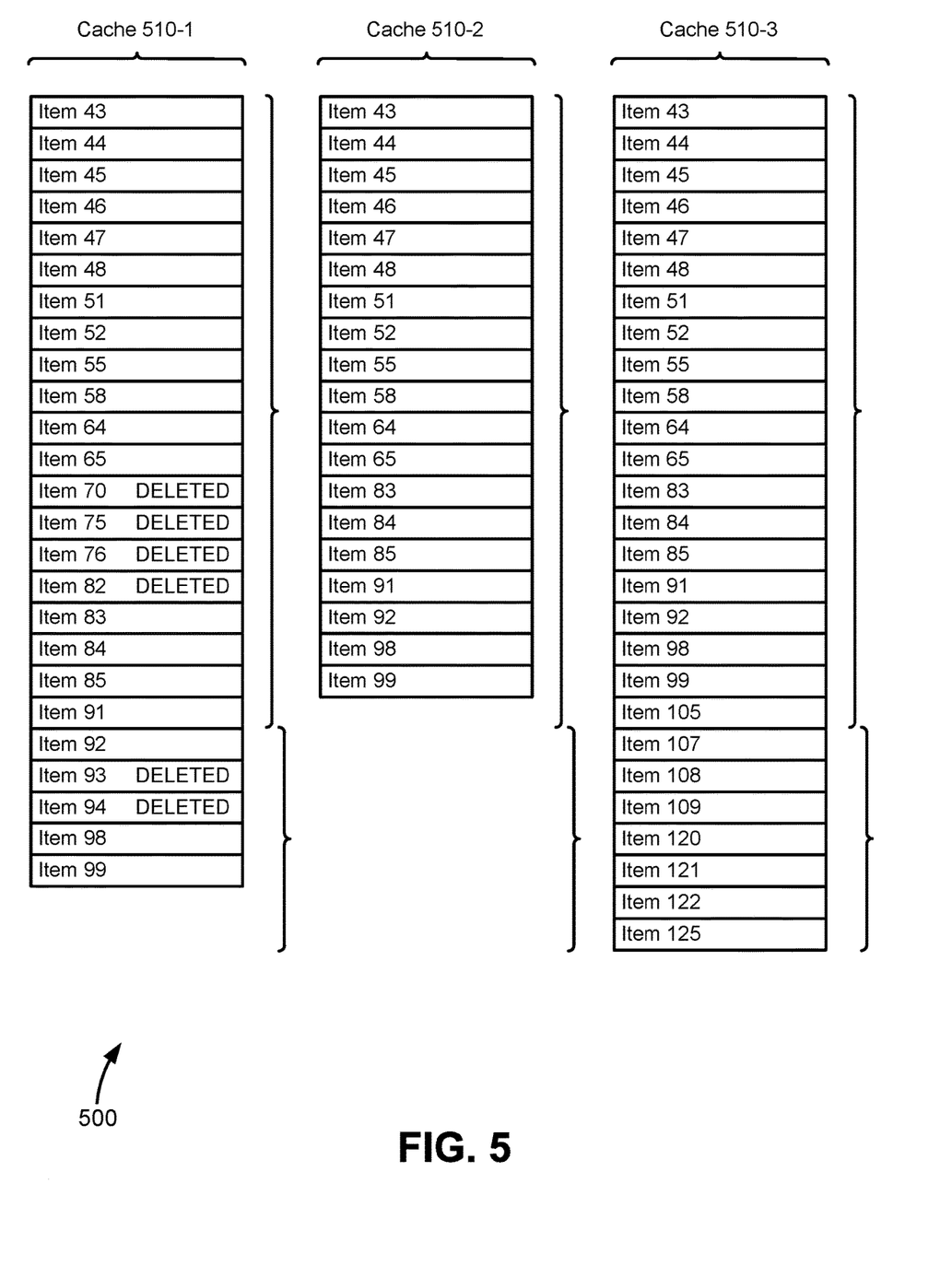
FIG. 5 illustrates various caches within a distributed database, according to an embodiment of the present disclosure.

FIG. 5 illustrates various caches within a distributed database 500, according to an embodiment of the present disclosure. Cache 510-1 shows various instructions being executed, including deletions of Items 70, 75, 76, 82, 93, and 94. Cache 510-2 shows the resulting cache after the deletions are made to cache 510-1. Cache 510-2 contains a set of ordered items having a length less than N, which causes the cache to be invalidated. Cache 510-3 is a rebuilt cache of the invalidated cache 510-2, in which items are added until the length of the set of ordered items equals N+B. The added items may be obtained from the distributed database 500, or may be added by a user of the distributed database 500.

Figure 6:
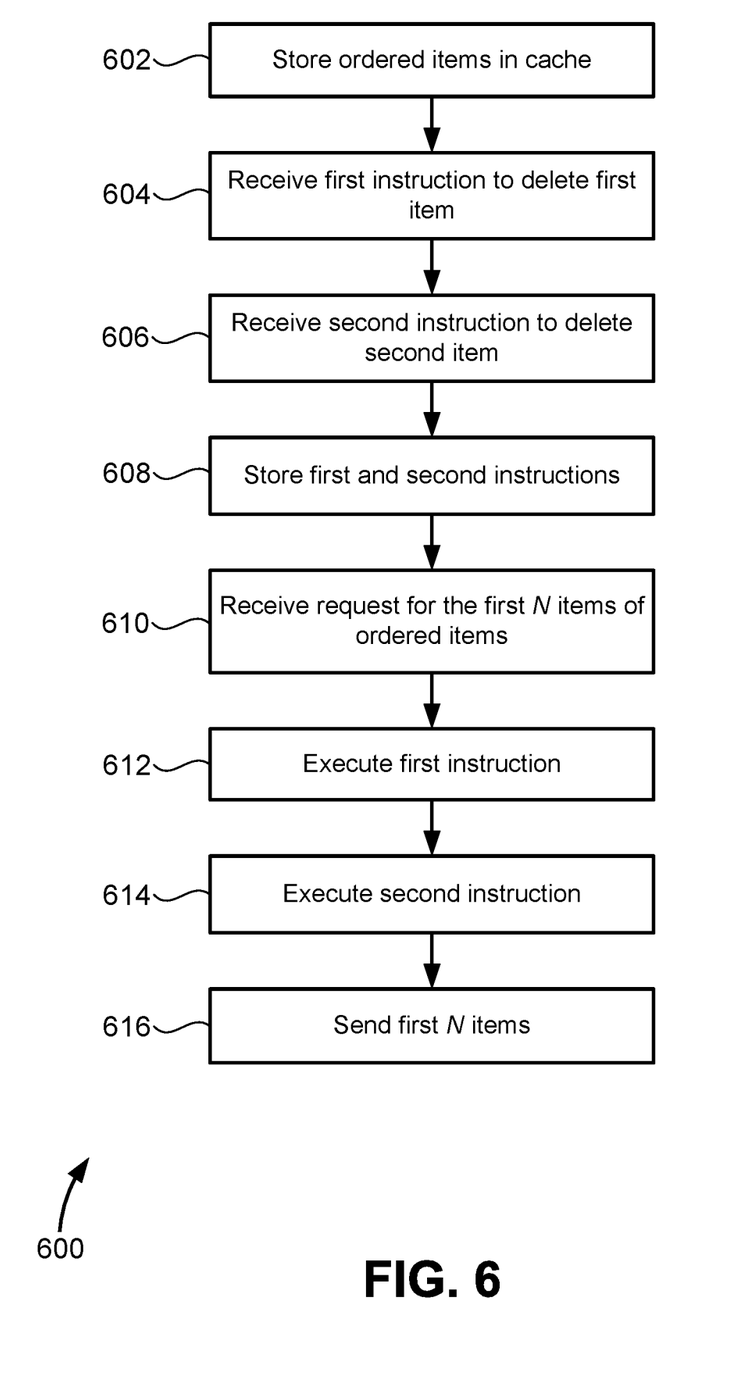
FIG. 6 illustrates a method for retrieving a set of ordered items, according to an embodiment of the present disclosure.

FIG. 6 illustrates a method 600 for retrieving a set of ordered items, according to an embodiment of the present disclosure. Steps of method 600 need not be performed in the order shown, and all steps need not be performed. At step 602, a plurality of ordered items are stored at a cache. The plurality of ordered items may have a length of N+B at a first instant in time. At step 604, a first instruction to delete a first item of the plurality of ordered items is received. At step 606, a second instruction to add a second item to the plurality of ordered items is received. At step 608, the first instruction and the second instruction are stored in a change log.

At step 610, a request for the first N items of the plurality of ordered items is received. At step 612, the first instruction is executed by deleting the first item from the plurality of ordered items. At step 614, the second instruction is executed by adding the second item to the plurality of ordered items. At step 616, the first N items of the plurality of ordered items are sent in response to the request.

Delayed Non-Duplicated Work Queue

In another embodiment of the present disclosure, a delayed non-duplicated work queue for handling work messages and instructions is presented. In large computing environments, message queues can be utilized to improve integration scalability between two or more systems. In the case of a distributed work queue where un-partitioned producers (i.e., processes that identify and create work messages for other processes to perform) are less aware of each other, duplicate work messages can be generated frequently. This makes the overall work completion of consumers (i.e., the processes that receive the messages and perform the work) much less efficient as they perform duplicate work unnecessarily.

The delayed non-duplicated work queue presented herein operates at a higher efficiency than traditional work queues by processing jobs in the queue only when either the job has not been modified for a certain amount of time or when a certain amount of time has passed since the job first appeared in the queue. A job is considered "modified" when either it is first added to the queue or when a duplicate job is added to the queue. This will be discussed in further detail below.

Figure 7:
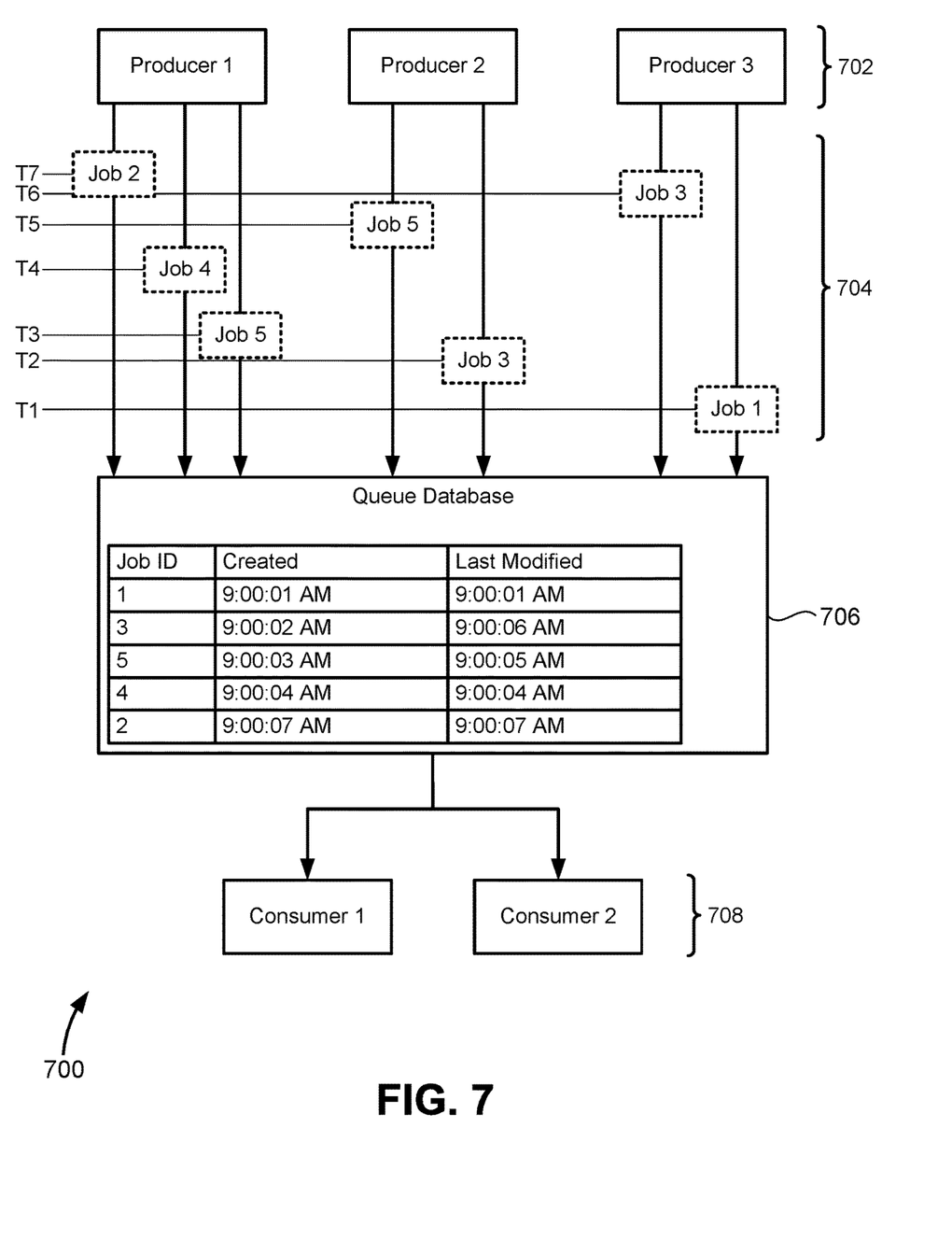
FIG. 7 illustrates a block diagram of a queue system, according to an embodiment of the present disclosure.

FIG. 7 illustrates a block diagram of a queue system 700, according to an embodiment of the present disclosure. The queue system 700 includes producers 702 which create jobs 704 (i.e., work messages), a queue database 706 which receives jobs 704 from producers 702, and consumers 708 which receive jobs 704 from the queue database 706 and execute them. In some embodiments, jobs 704 are produced by different producers independently of each other, and consequently some jobs may be identical to other jobs. For example, both Producer 1 and Producer 2 create a Job 5, and both Producer 2 and Producer 3 create a Job 3, albeit at different times (T3, T5, T2, and T6, respectively).

Producers 702 create jobs 704 (i.e., work messages) that include several attributes. First, jobs 704 include a job identifier, which is an identifier that is well-known by all producers 702 that allows the queue database 706 to recognize duplicate work. An example of this may be the ID of the object to be worked on or processed. Second, jobs 704 are each associated with a created timestamp, which represents the system time when the job was added to the queue database 706. Third, jobs 704 are each associated with a last modified timestamp, which represents the system time when the job was last updated. For example, Job 1 has a created timestamp of 9:00:01 AM (T1) and a last modified timestamp of 9:00:01 AM (T1), Job 3 has a created timestamp of 9:00:02 AM (T2) and a last modified timestamp of 9:00:06 AM (T6), and Job 5 has a created timestamp of 9:00:03 AM (T3) and a last modified timestamp of 9:00:05 AM (T5).

Figure 8:
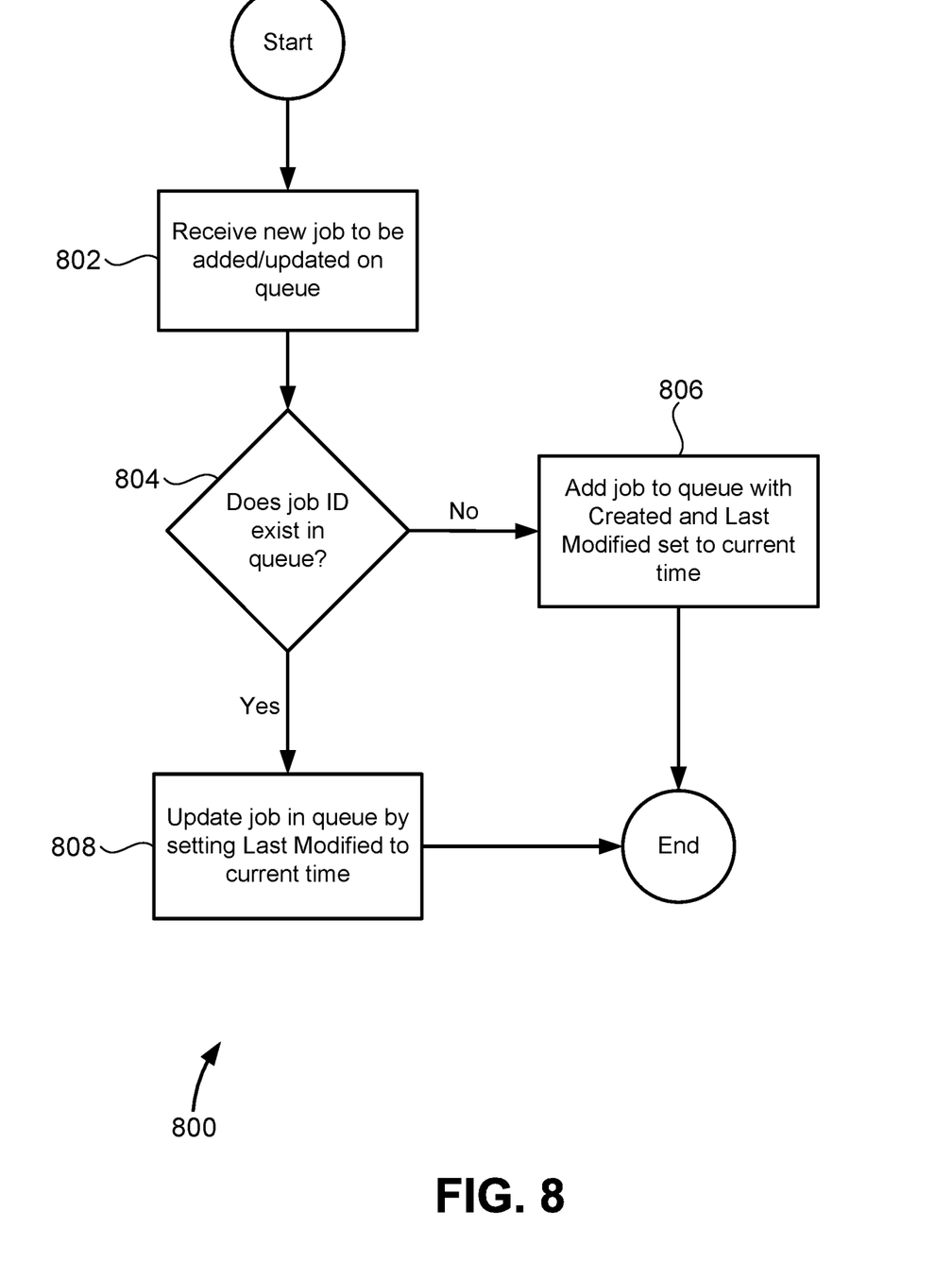
FIG. 8 illustrates a method for adding jobs to a queue, according to an embodiment of the present disclosure.

FIG. 8 illustrates a method 800 for adding jobs to a queue, according to an embodiment of the present disclosure. At step 802, a new job is received by the queue database 706. At step 804, it is determined whether the job ID of the new job exists already in the queue database 706. If it does not already exist, at step 806, the new job is added to the queue with the created timestamp and the last modified timestamp set to the current time. If the new job does already exist in the queue database 706, at step 808, the last modified timestamp of the already existing job is set to the current time.

Figure 9:
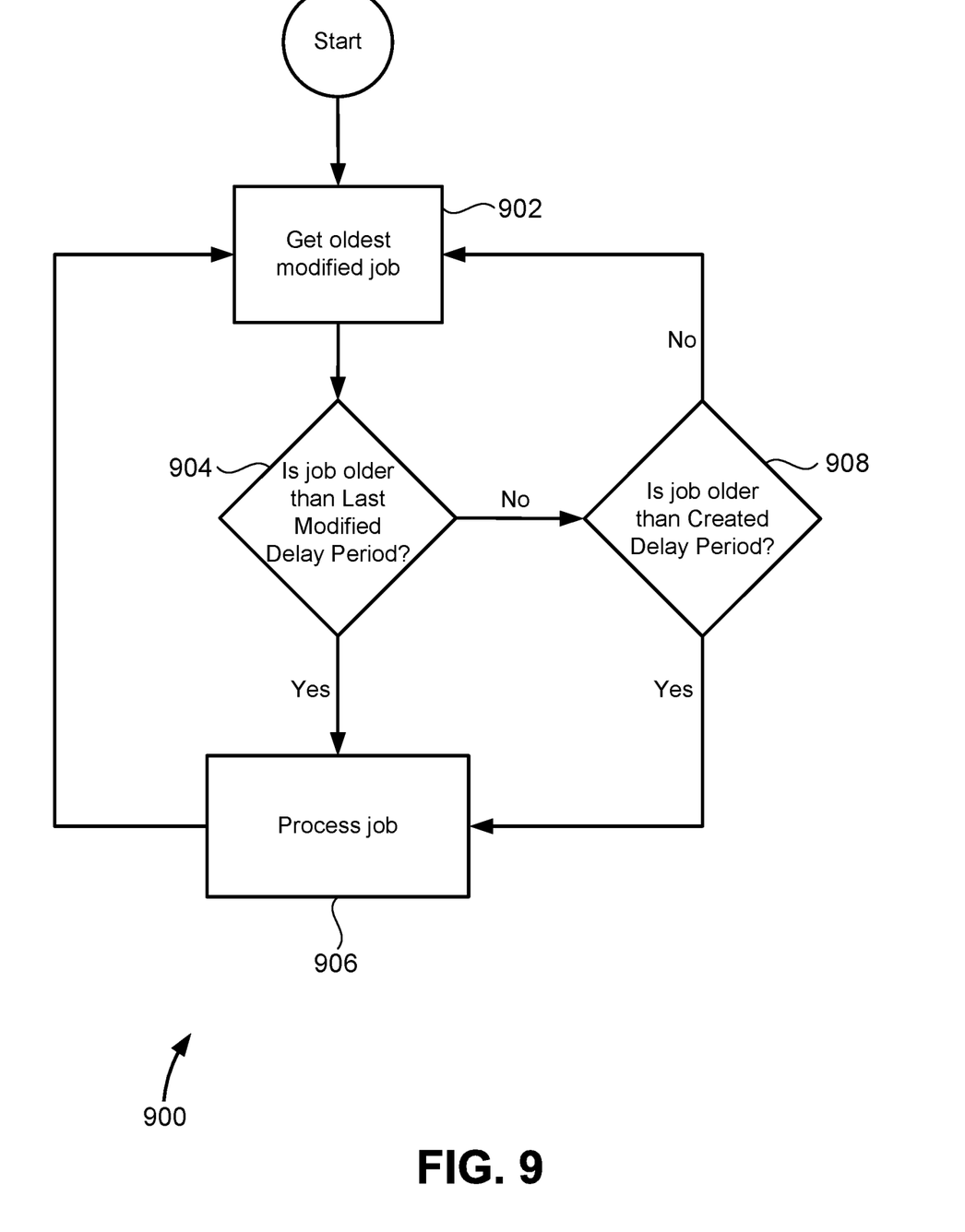
FIG. 9 illustrates a method for processing jobs from a queue, according to an embodiment of the present disclosure.

FIG. 9 illustrates a method 900 for processing jobs from a queue, according to an embodiment of the present disclosure. At step 902, the job with the oldest last modified timestamp is identified. For example, the job with the oldest last modified timestamp in the queue database 706 is Job 1 (9:00:01 AM). At step 904, it is determined whether the identified job is older (in terms of last modified timestamp) than a constant called the Last Modified Delay Period. For example, if the current time is 9:00:10 AM and the Last Modified Delay Period is 10 seconds, then it would be determined that the identified job is not older than the Last Modified Delay Period (9 seconds<10 seconds). Furthermore, if the current time is 9:00:12 AM and the Last Modified Delay Period is 10 seconds, then it would be determined that the identified job is older than the Last Modified Delay Period (11 seconds>10 seconds).

If it is determined that the identified job is older than the Last Modified Delay Period, at step 906, the identified job is processed. If it is determined that the identified job is not older than the Last Modified Delay Period, at step 908, it is determined whether the identified job is older (in terms of created timestamp) than a constant called the Created Delay Period. If the identified job is older, step 906 is performed. If the identified job is not older, method 900 is restarted at step 902. Method 900 is also restarted at step 902 after performance of step 906.

The Last Modified Delay Period prevents the queue system 700 from processing jobs that are experiencing a period with a high frequency of duplicate jobs. Often different consumers may be attempting to solve the same issue within the computing environment, and the queue database 706 may receive a higher number of duplicate jobs during these periods. The Last Modified Delay Period may be tailored to prevent the same job from being processed multiple times during high traffic periods. In some embodiments, the Last Modified Delay Period is not a constant but is a variable that is a function of the number of duplicate jobs, a function of time, or a function of some other value. For example, the Last Modified Delay Period may initially start at 20 seconds, and then be decreased by 1 second for each subsequent duplicate job that enters the queue database 706. As another example, the Last Modified Delay Period may initially start at 20 seconds, and then be decreased by 1 second for each second that passes, similar to a countdown timer.

The Created Delay Period prevents highly-duplicated messages from being neglected for too long. It puts a limit on the amount of time a job may sit in the queue database 706 from when it is first received by the queue database 706 and assigned a created timestamp. In some embodiments, the Created Delay Period is not a constant but is a variable that is a function of the number of duplicate jobs, a function of time, or a function of some other value. For example, the Created Delay Period may initially start at 30 seconds, and then be increased by 1 second for each duplicate job that enters the queue database 706. Additionally, a maximum for the Created Delay Period may be set to some value, such as 40 seconds.

Simplified Computer System

Figure 10:
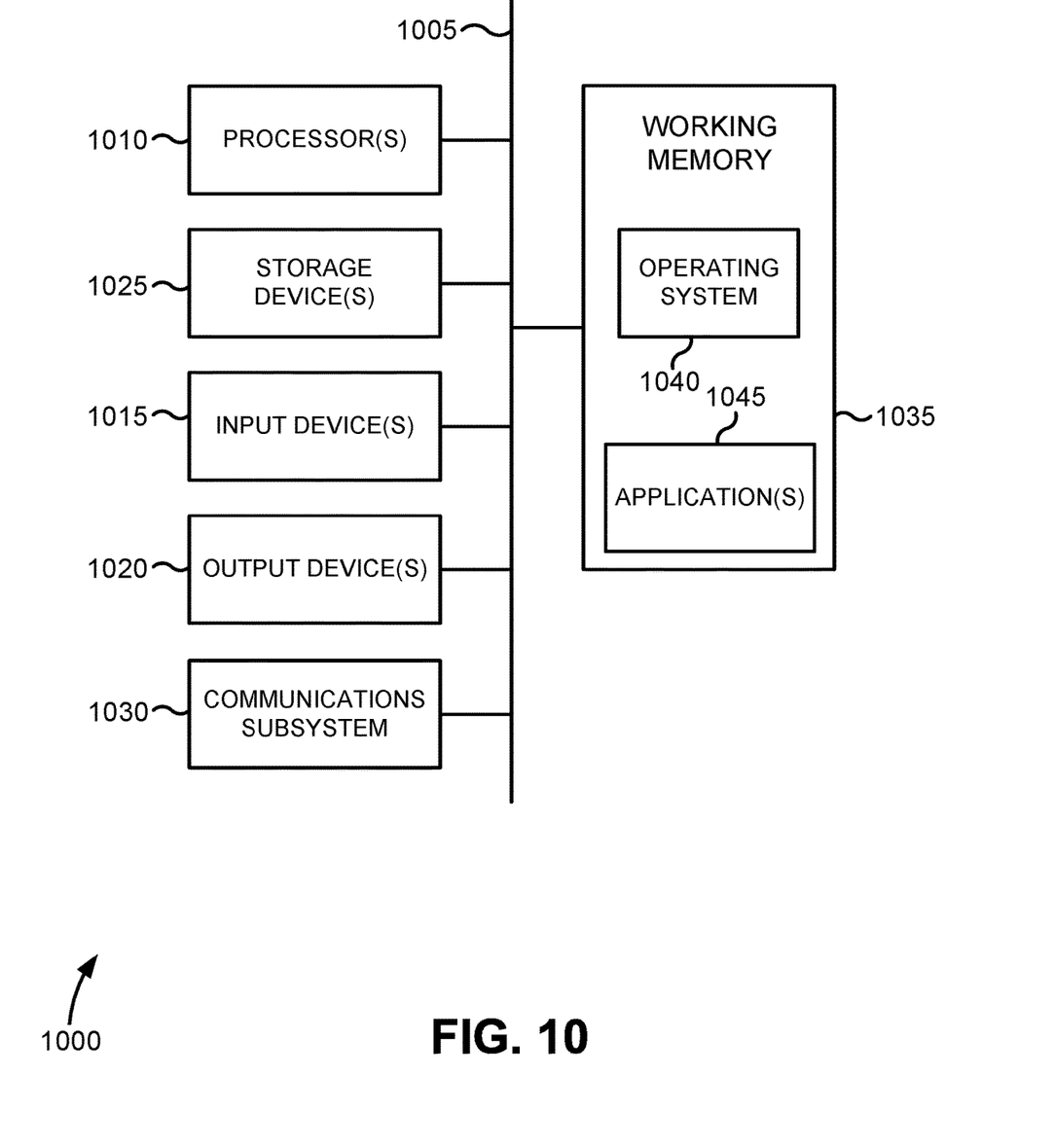
FIG. 10 illustrates a simplified computer system, according to an embodiment of the present disclosure.

FIG. 10 shows a simplified computer system 1000, according to some embodiments of the present disclosure. A computer system 1000 as illustrated in FIG. 10 may be incorporated into devices such as a portable electronic device, mobile phone, or other device as described herein. FIG. 10 provides a schematic illustration of one embodiment of a computer system 1000 that can perform some or all of the steps of the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005, or may otherwise be in communication, as appropriate. The hardware elements may include one or more processors 1010, including without limitation one or more general-purpose processors and/or one or more special-purpose processors such as digital signal processing chips, graphics acceleration processors, and/or the like; one or more input devices 1015, which can include without limitation a mouse, a keyboard, a camera, and/or the like; and one or more output devices 1020, which can include without limitation a display device, a printer, and/or the like.

The computer system 1000 may further include and/or be in communication with one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1030 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1030. In other embodiments, a portable electronic device, e.g. the first electronic device, may be incorporated into the computer system 1000, e.g., an electronic device as an input device 1015. In some embodiments, the computer system 1000 will further comprise a working memory 1035, which can include a RAM or ROM device, as described above.

The computer system 1000 also can include software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 10, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1025 described above. In some cases, the storage medium might be incorporated within a computer system, such as computer system 1000. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1000 to perform methods in accordance with various embodiments of the technology. According to a set of embodiments, some or all of the procedures of such methods are performed by the computer system 1000 in response to processor 1010 executing one or more sequences of one or more instructions, which might be incorporated into the operating system 1040 and/or other code, such as an application program 1045, contained in the working memory 1035. Such instructions may be read into the working memory 1035 from another computer-readable medium, such as one or more of the storage device(s) 1025. Merely by way of example, execution of the sequences of instructions contained in the working memory 1035 might cause the processor(s) 1010 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 and/or components thereof generally will receive signals, and the bus 1005 then might carry the signals and/or the data, instructions, etc. carried by the signals to the working memory 1035, from which the processor(s) 1010 retrieves and executes the instructions. The instructions received by the working memory 1035 may optionally be stored on a non-transitory storage device 1025 either before or after execution by the processor(s) 1010.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A computer-implemented method comprising:
    storing, at a cache, a plurality of ordered items, wherein the plurality of ordered items has a length of N+B at a first instant in time, N and B being positive integers;
    receiving, at the cache, a first instruction to delete a first item of the plurality of ordered items;
    receiving, at the cache, a second instruction to add a second item to the plurality of ordered items;
    storing the first instruction and the second instruction;
    receiving, at the cache, a request for the first N items of the plurality of ordered items;
    in response to receiving the request:
        executing the first instruction by deleting the first item from the plurality of ordered items; and
        executing the second instruction by adding the second item to the plurality of ordered items; and
    sending the first N items of the plurality of ordered items in response to the request.

2. The computer-implemented method of claim 1, wherein the first instruction and the second instruction are stored in a change log.

3. The computer-implemented method of claim 1, wherein:
    deleting a certain item from the plurality of ordered items causes the length of the plurality of ordered items to decrease by one; and
    adding the certain item to the plurality of ordered items causes the length of the plurality of ordered items to increase by one.

4. The computer-implemented method of claim 1, further comprising:
    receiving, at the cache, a third instruction to update a third item of the plurality of ordered items;
    storing the third instruction; and
    executing the third instruction by updating the third item of the plurality of ordered items.

5. The computer-implemented method of claim 1, wherein sending the first N items occurs after executing the first instruction and executing the second instruction.

6. The computer-implemented method of claim 5, wherein the plurality of ordered items has a length of less than N at a second instant in time, and wherein the computer-implemented method further comprises:
  invaliding the cache; and
  rebuilding the cache such that the plurality of ordered items has a length of N+B.

7. A computer readable storage media comprising instructions to cause one or more processors to perform operations comprising:
  storing, at a cache, a plurality of ordered items, wherein the plurality of ordered items has a length of N+B at a first instant in time, N and B being positive integers;
  receiving, at the cache, a first instruction to delete a first item of the plurality of ordered items;
  receiving, at the cache, a second instruction to add a second item to the plurality of ordered items;
  storing the first instruction and the second instruction;
  receiving, at the cache, a request for the first N items of the plurality of ordered items;
  in response to receiving the request:
    executing the first instruction by deleting the first item from the plurality of ordered items; and
    executing the second instruction by adding the second item to the plurality of ordered items; and
  sending the first N items of the plurality of ordered items in response to the request.

8. The computer readable storage media of claim 7, wherein the first instruction and the second instruction are stored in a change log.

9. The computer readable storage media of claim 7, wherein:
  deleting a certain item from the plurality of ordered items causes the length of the plurality of ordered items to decrease by one; and
  adding the certain item to the plurality of ordered items causes the length of the plurality of ordered items to increase by one.

10. The computer readable storage media of claim 7, further comprising instructions to cause one or more processors to perform operations further comprising:
  receiving, at the cache, a third instruction to update a third item of the plurality of ordered items;
  storing the third instruction; and
  executing the third instruction by updating the third item of the plurality of ordered items.

11. The computer readable storage media of claim 7, wherein sending the first N items occurs after executing the first instruction and executing the second instruction.

12. The computer readable storage media of claim 11, wherein the plurality of ordered items has a length of less than N at a second instant in time, and wherein the computer readable storage media further comprises instructions to cause one or more processors to perform operations further comprising:
  invaliding the cache; and
  rebuilding the cache such that the plurality of ordered items has a length of N+B.

13. A system comprising:
  one or more processors; and
  one or more computer readable storage mediums comprising instructions to cause the one or more processors to perform operations comprising:
    storing, at a cache, a plurality of ordered items, wherein the plurality of ordered items has a length of N+B at a first instant in time, N and B being positive integers;
    receiving, at the cache, a first instruction to delete a first item of the plurality of ordered items;
    receiving, at the cache, a second instruction to add a second item to the plurality of ordered items;
    storing the first instruction and the second instruction;
    receiving, at the cache, a request for the first N items of the plurality of ordered items;
    in response to receiving the request:
      executing the first instruction by deleting the first item from the plurality of ordered items; and
      executing the second instruction by adding the second item to the plurality of ordered items; and
    sending the first N items of the plurality of ordered items in response to the request.

14. The system of claim 13, wherein the first instruction and the second instruction are stored in a change log.

15. The system of claim 13, wherein:
  deleting a certain item from the plurality of ordered items causes the length of the plurality of ordered items to decrease by one; and
  adding the certain item to the plurality of ordered items causes the length of the plurality of ordered items to increase by one.

16. The system of claim 13, wherein the one or more computer readable storage mediums further comprise instructions to cause the one or more processors to perform operations further comprising:
  receiving, at the cache, a third instruction to update a third item of the plurality of ordered items;
  storing the third instruction; and
  executing the third instruction by updating the third item of the plurality of ordered items.

17. The system of claim 13, wherein sending the first N items occurs after executing the first instruction and executing the second instruction.

* * * * *